United States Patent [19]

Desmet

[11] 4,332,862

[45] Jun. 1, 1982

[54] WELDED FLEXIBLE SCREEN DECK

[75] Inventor: John Desmet, Deerlijk, Belgium

[73] Assignee: N. V. Bekaert S. A., Zwevegem, Belgium

[21] Appl. No.: 109,880

[22] Filed: Jan. 7, 1980

[30] Foreign Application Priority Data

Jan. 16, 1979 [BE] Belgium ................................ 873488

[51] Int. Cl.[3] .......................... B32B 3/30; B01D 39/10

[52] U.S. Cl. .................................... 428/593; 210/499; 233/2; 428/594; 428/598

[58] Field of Search ........................ 428/593, 594, 598; 245/11; 209/400, 401; 210/397, 499; 233/2

[56] References Cited

U.S. PATENT DOCUMENTS

| | | | |
|---|---|---|---|
| 1,814,598 | 7/1931 | Herrmann | 209/401 X |
| 2,271,662 | 2/1942 | Rubissow | 428/593 X |
| 3,491,888 | 1/1970 | Colburn et al. | 233/2 X |
| 3,941,703 | 3/1976 | Binard | 210/499 |

FOREIGN PATENT DOCUMENTS

| | | | |
|---|---|---|---|
| 409685 | 2/1925 | Fed. Rep. of Germany | 210/401 |
| 2292508 | 6/1976 | France | 210/499 |
| 1336594 | 11/1973 | United Kingdom | 209/401 |

OTHER PUBLICATIONS

Baumann et al.: "When To Use A Pusher Centrifuge," Chemical Engineering Progress; vol. 69, No. 9, Sep. 1973, pp. 62–66.

*Primary Examiner*—Richard D. Lovering
*Attorney, Agent, or Firm*—Edward J. Brenner

[57] ABSTRACT

A welded flexible screen deck comprising a series of parallel screen rods and transverse supporting rods wherein the supporting rods are secured at the back side of the screen and have a cross-sectional profile with a substantially rectangular body portion and a rib portion resting against the screen rods such that the height h of the cross section does not exceed the width b and wherein the thickness d of the body portion is ≦ h/2.

3 Claims, 2 Drawing Figures

WELDED FLEXIBLE SCREEN DECK

BACKGROUND OF THE INVENTION

The invention relates to a welded flexible screen deck, in particular to cylindrical or curved screen decks.

Such screen decks whereby the stainless steel screen rods, as well as the supporting rods are triangular in cross section are widely known. The screen decks are then for example welded while laid out flat and afterwards the supporting rods are given the desired curvature radius to obtain the curved screen decks with the deck rods as generatrices of the deck curvature. After being bent to size, the screen decks are subsequently built into screening installations such as centrifuges.

A disadvantage of these screen decks which are preliminary bent to size is that, on the one hand, they require more storage or shipment space than flat screen decks, and, on the other hand, that even the slightest construction deviation confronts the screening installation builder with problems for incorporating, connecting, and sealing the curved screen deck segments.

SUMMARY OF THE INVENTION

It is an object of this invention to overcome these disadvantages by providing a welded screen deck with parallel screen rods and transverse flexible supporting rods secured at the back side of the screen. In this way, an extremely smooth screen deck surface is obtained, which is not possible with knotted screen decks. Clogging in the connecting zones between the screen rods and the supporting rods like those found in knotted screens do not occur with welded screens. The filtering cakes formed during screening can easily be slid or scraped from the screen surface without the cake residues staying stuck in the connecting zones. The flexible welded screen decks are therefore particularly suited for being mounted in pusher centrifuges.

The flexible supporting wires of the screens according to the invention must present, apart from good weldability to the screen rods, a cross-sectional shape (cross-section perpendicular to the longitudinal axis of the rod) with a small moment of inertia about an axis perpendicular to the screen deck and a relatively great moment of inertia about an axial direction perpendicular to the former. The profile of the cross-section will preferably comprise a substantially rectangular body portion and a rib portion contacting the screen wires whereby the width b of the body portion is at least equal to the height h of the cross-sectional profile and whereby $h \geqq 2d$ where d is the thickness of the body portion. In practice, $1.5\ \text{mm} \leqq b \leqq 5\ \text{mm}$ depending on the required strength of the supporting rods.

DESCRIPTION OF THE DRAWINGS

Examples of suitable cross-sectional profiles for supporting rods will now be clarified with reference to the accompanying figures.

DESCRIPTION OF THE PREFERRED EMBODIMENTS

Figure 1:
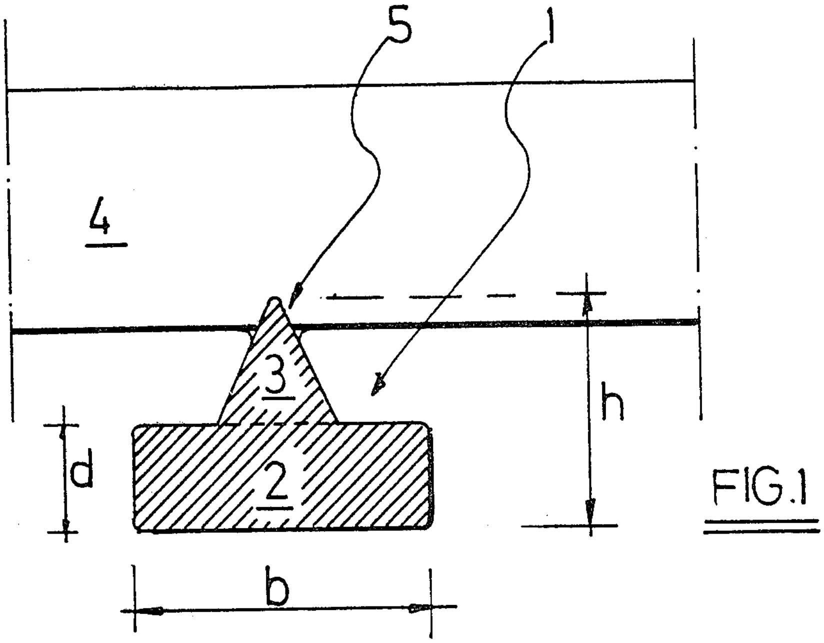
FIG. 1 is a view of a T-shaped cross-section of a supporting rod according to the invention.

The supporting rod 1 shown in FIG. 1 is welded in zone 5 with its rib portion 3 to the screen rod 4. The body portion 2 has a width b and a thickness d, whereas the height of the cross-sectional profile is designated by h. The rib portion 3 corresponds with the leg of the T-shaped cross-section and preferably has the form of a substantially isosceles triangle with a base resting against the body portion 2 of the T. The base width of this triangle is smaller than half the width b of the body portion 2.

Figure 2:
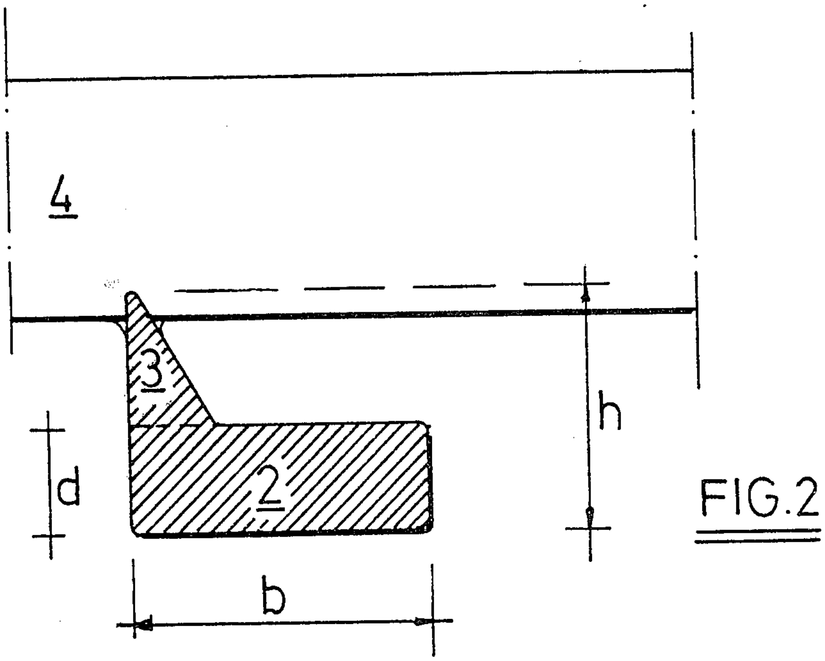
FIG. 2 is an illustration of an L-shaped cross-section of a supporting rod according to the invention.

As illustrated in FIG. 2, the supporting rods may also have an L-shaped cross-section whereby the rib portion 3 corresponds with the leg of the L. This rib portion may be a right-angled triangle which with its shorter leg side rests against the body portion 2 of the L whereby the length of this leg side is maximum half the width b of the body portion 2.

It is also possible to use supporting rods with certain Y-shaped cross-sections.

The welded screen decks may be convexly or concavely bent, possibly into cylinders. Obviously, the gaps between the screen rods when welded while laid out flat will have to be adapted so that the required curvature radius of the screen curve receives the ultimately desired gap width. The invention therefore also comprises screening installations, particularly centrifuges (for example pusher centrifuges) in which these curved screen decks are used.

What is claimed is:

1. A welded flexible screen deck comprising a series of parallel screen rods and transverse supporting rods wherein the supporting rods (1) are secured at the back side of the screen and have a cross-sectional profile with a substantially rectangular body portion (2) and a rib portion (3) resting against the screen rods such that the height h of the cross-section does not exceed the width b and wherein the thickness d of the body portion is $\leqq h/2$.

2. A screen deck according to claim 1 wherein said supporting rods have a T-shaped cross-section and said rib portion (3) corresponds with the leg of the T.

3. A screen deck according to claim 2 wherein said leg of the T has the shape of a substantially isosceles triangle with a base resting against the body portion (2) of the T and with a base width which is smaller than half the width b of the body portion (2).

* * * * *